United States Patent

Ganser

[15] 3,665,609
[45] May 30, 1972

[54] APPARATUS FOR MAKING TIMING BELTS

[72] Inventor: Wilhelm Ganser, North-Rhine-Westphalia, Germany

[73] Assignee: Uniroyal Englebert Deutschland AG, Aachen, Germany

[22] Filed: Sept. 18, 1970

[21] Appl. No.: 73,416

[52] U.S. Cl. ............................................................33/32 C
[51] Int. Cl. ........................................................B43l 13/00
[58] Field of Search....................33/18 R, 19 A, 21 R, 32 R, 33/32 C

[56] References Cited

UNITED STATES PATENTS

| | | | |
|---|---|---|---|
| 2,496,936 | 2/1950 | Clutz et al. | 33/19 A |
| 2,752,670 | 7/1950 | Lorig | 33/21 R X |
| 3,087,248 | 4/1963 | Martin | 33/132 X |

Primary Examiner—Harry N. Haroian
Attorney—Steven H. Bazerman

[57] ABSTRACT

An apparatus is disclosed for the marking of toothed belts at predetermined distances along the belt and in fixed relationship to the belt teeth. A chucking and driving means for holding and positioning the belt to be marked is operably connected with a length measuring wheel so that they can be driven synchronously. The length measuring wheel has recesses corresponding to the points to be marked. A scanning means reads these markings and marking device marks the belts as indicated by the scanning means. The operation can be carried out automatically by means of a switching system working cooperatively with the length measuring wheel. Additional switches may be used to control the type of markings made on the belt blank.

10 Claims, 3 Drawing Figures

INVENTOR.
WILHELM GANSER

APPARATUS FOR MAKING TIMING BELTS

BACKGROUND OF THE INVENTION

This invention relates to an apparatus for the marking of toothed belts and more particularly the marking of such belts at predetermined distances along the belt and in fixed relationships to the belt teeth.

Power transmission belts consisting of a toothed elastomeric body with a non-stretchable load supporting filament such as seen in U.S. Pat. No. 2,507,852 issued to Case on May 16, 1950, are finding wider and wider fields of application, particularly in the replacing of gear and chain drives. Because of such belt's engagement accuracy and non-stretch characteristics they are suited for applications in which the pulleys, drives and the like to be interconnected by the belts have precisely determined angular relations which must be maintained during operation. For example, toothed belts have been used to replace the traditional camshaft drives in internal combustion engines. The camshaft must be brought into a predetermined position relative to the crankshaft and it must maintain this position throughout operation.

SUMMARY OF THE INVENTION

It is the object of the present invention to provide apparatus for marking toothed belts to indicate predetermined points along the toothed belt for alignment of the drive system in which the belt is to be used in a simple, automatic and inexpensive manner.

According to the present invention the belt is marked by positioning a belt blank on a chucking and driving device associated with a length measuring wheel which is driven synchronously with the belt blank and which has projections or recesses corresponding to the spacing of the markings to be applied. A device for scanning the projections or recesses while the belt blank is being driven cooperates with a marking device which is movable transversely across the backside of the belt blank in response to the scanning device.

The use of this device assures that markings are applied in production at identical spacings in a predetermined relationship with the belt teeth. If the spacings of the markings are to be changed, the measuring wheel or the scanning device may be adjusted with relatively little difficulty.

Known equipment may be used as the chucking and driving device such as that used for dissecting belt blanks into individual belts as seen in U.S. Pat. No. 3,107,563, issued to Sauer on Oct. 22, 1963, for example. Toothed belts of various circumferential lengths can be chucked and driven by this equipment. According to the present invention correlated and driven synchronously with such a chucking and driving device is a length measuring wheel. Above the chucking and driving device, a marking carriage is transversely movable across the belt blank. In this manner, the marking may be applied on the same equipment as and immediately before the dissection of the belt blank. A device may be correlated with the length measuring wheel to indicate the starting position, correlated with a particular point along the tooth profile. If desired, indication of the starting position on the belt may be made by a marking of different color or shape. A drive mechanism for the chucking and driving device and/or the marking carriage may be controlled by the scanning means. The novel arrangement of the present invention may be used in manual, semi-automatic or fully automatic operation. Marking pencils, marking tools, liquid dye or other means may be used for the making of the actual markings.

BRIEF DESCRIPTION OF THE DRAWINGS

The apparatus is illustrated in the accompanying drawings in which:

FIG. 3 is a side view of the invention according to FIG. 1 without a belt mounted thereon.

cDESCRIPTION OF THE PREFERRED EMBODIMENTS

Figure 1:
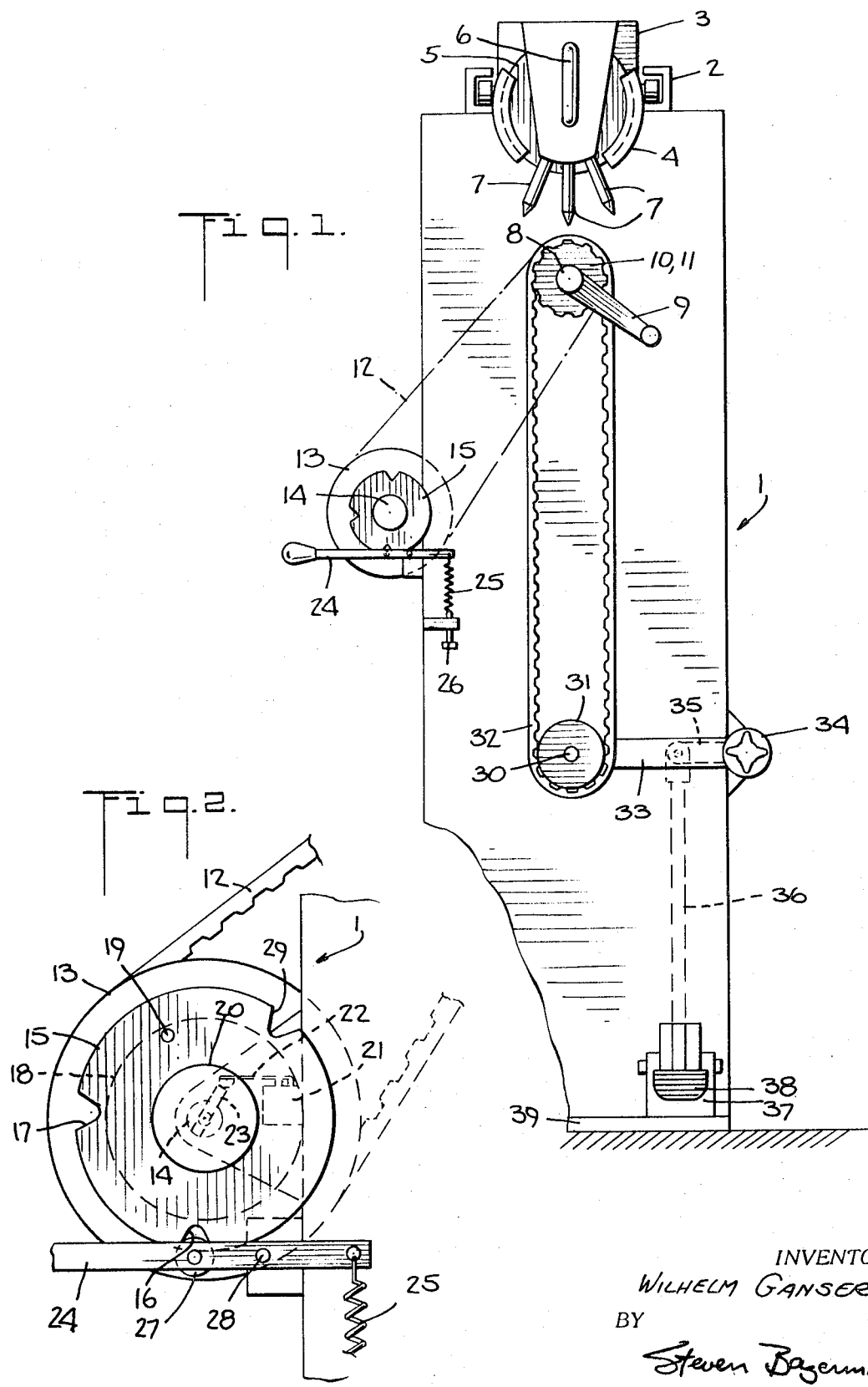
FIG. 1 shows a front view according to the present invention.

In order to simplify the drawings, the apparatus illustrated is designed for manual operation. With alterations as indicated herein, the apparatus can be easily adapted for semi or fully automatic operation. A frame consisting of a vertical support wall 1 is mounted on a base 39. Mounted on one side of the upper end of wall 1 is a track 2 which supports a marking carriage 3. The front end of the carriage 3 has a circular guide or track 4 in which is pivoted a circular flange 5. Flange 5 supports the marking elements 7 so that by pivoting the flange 5 various individual marking elements 7 may be brought into operating position. To accomplish this, the marking carriage has a handle 6 which can be used for pivoting the marking device and for moving the marking carriage 3 back and forth manually.

Below the carriage track 2, a shaft 8 is mounted on vertical wall 1. A toothed pulley 10 whose teeth conform to the teeth of the belt blank 32 to be marked is mounted on shaft 8 on the opposite side of wall 1 from track 2. If manually operated, shaft 8 is driven by crank 9. Alternately shaft 8 may be driven by a motor (not shown). With the crank 9 in a downward position, the belt blank 32 can be easily pushed over the toothed pulley 10 and tensioning pulley 31. On the other side of wall 1 from pulleys 10 and 31, shaft 8 supports a toothed pulley 11 which, via toothed belt 12, drives another toothed pulley 13 on shaft 14. Shaft 14 is parallel to shaft 8 but is offset relative to it.

Figure 2:
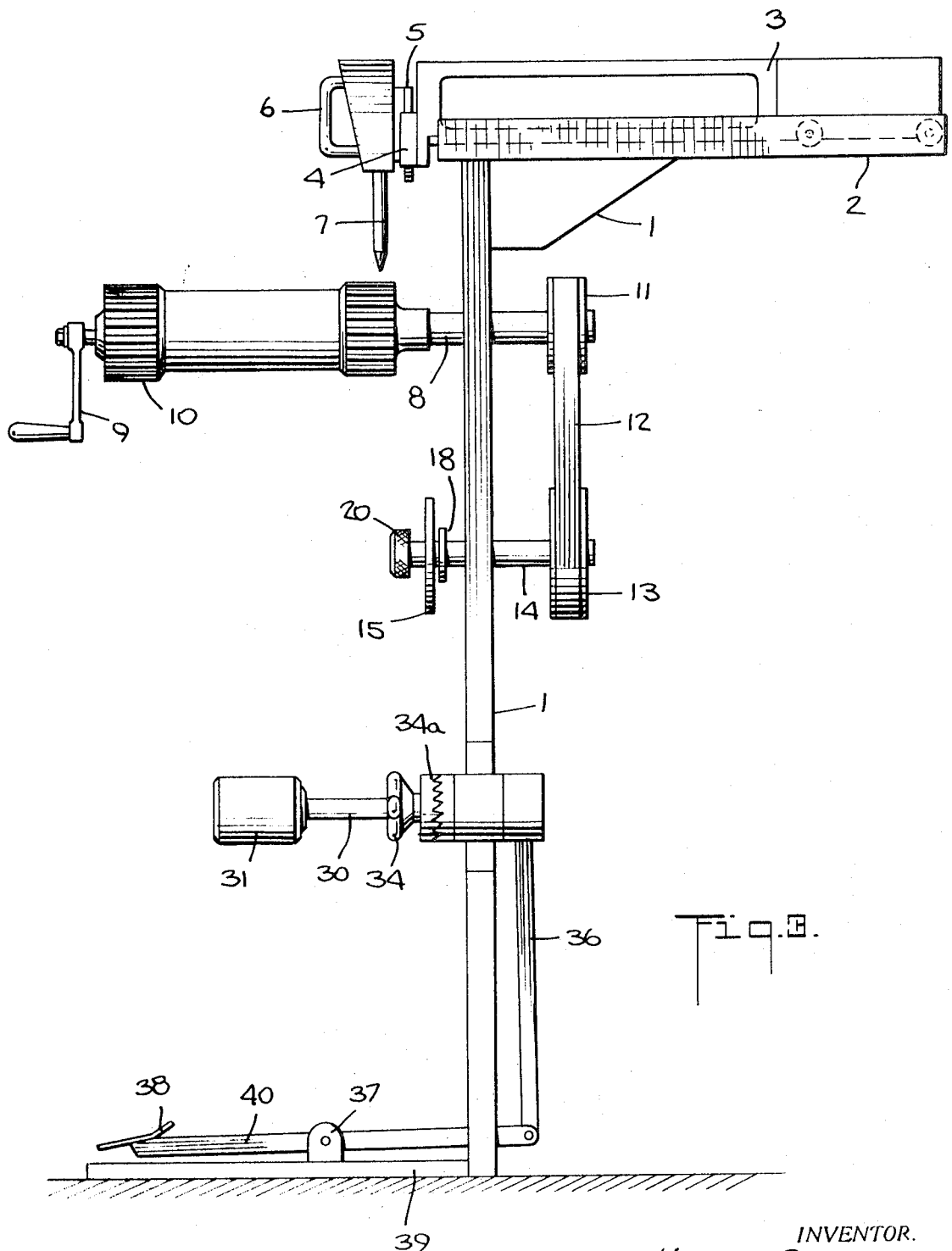
FIG. 2 is a break-away enlargement of a portion of FIG. 1.

As can be seen in FIG. 2, shaft 14 has a fastening plate 18 with driving pin 19 attached thereto and a controlling cam 23 mounted in a predetermined position such that it can actuate electrical switch 21 via contact 22. The fastening plate 18 serves to retain and drive the length measuring wheel 15 which has control recesses 16, 17 and 29 at various points along the circumference corresponding to positions to be marked on the belt blank 32. Measuring wheel 15 has a hole which is positioned to receive driving pin 19 to positively interconnect plate 18 and wheel 15. The wheel 15 is held on shaft 14 by a clamping screw or nut 20 such that the wheel 15 is easily replaceable to allow adjustment of the spacing of the marks. The relative sizes of pulley 13 and pulley 11 determine the number of revolutions of pulley 10 required to turn wheel 15 through one cycle.

Length measuring wheel 15 is so positioned that cam 23 actuates the switch 21 simultaneously with scanning roll 27 of the scanning lever 24 snapping into recess 16 of wheel 15. The scanning lever 24 is pivoted at 28 and is preloaded by a spring 25 in the direction of the center line of the shaft 14. The lever 24 can be disengaged from the recesses in the length measuring wheel 15 manually but recesses 16, 17, 29 and the scanning roll 27 are so dimensioned that movement of the measuring wheel 15 will cause the roll 27 to disengage from the recess. Lever 24 and switch 21 may actuate a signaling mechanism or a motor control system for marking the belt as will be more fully explained hereafter. The rotary motion of the wheel 15 is derived from drive shaft 8 through belt 12.

Tensioning pulley 31 is mounted on a moveable shaft 30 and need not be toothed. Shaft 30 is in turn mounted on arm 33. Arm 33 can be fixed at various angles relative to a second arm 35 by means of an adjustable clutch 34. Arms 33 and 35 are pivoted about the center line of clutch 34 which is fixedly mounted to the wall 1. Linked to arm 35 is a rod 36. Rod 36 is controlled by lever 40 and foot pedal 38. The lever 40 is mounted on base 39 and pivoted at fulcrum 37. Arm 35 and tensioning pulley 31 can be raised by depressing pedal 40. When tensioning roll 31 is raised, a belt blank can be positioned around pulleys 10 and 31, and when pedal 40 is released, the belt blank is firmly seated on pulley 10 due to the natural weight of the lowered tensioning pulley 31. The clutch 34 and 34a are to adjust the positioning of tensioning pulley 31 so that various belt lengths can be processed in the same equipment.

In operation, the belt blank 32 to be marked is positioned on pulleys 10 and 31 is as indicated above. Thereafter the belt blank 32 is brought into position by rotating the pulleys 10 and 31 until switch 21 is actuated by cam 23 and simultaneously roll 27 snaps into the recess 15. If, as shown in the drawings, the apparatus is set up for manual operation, the positioning of roll 27 into recess 15 would indicate to the operator to stop rotating handle 21 and switch 21 would actuate a light which would notify the operator to select the appropriate marking pen for the first position by means of handle 6. He would then pull carriage 3 across the belt and by so doing, mark it. Alternately, if automatic operation is contemplated, the belt is properly marked by the combined operation of switch 21 with a motor means (not shown) to select the correct marking means 7 and the operation of switching means controlled by roll 27 with a motor means (not shown) to stop pulley 10, and move carriage 3 across the belt blank. Thereafter, rotation of pulley 10 is resumed either by means of crank 9 or a motor until the scanning roll 27 snaps into the next recess 17. In this position after the selection of the correct marking pencil 7, manually or through other switch means similar to switch 21 the second marking is applied either manually or automatically to the back of the belt blank 32. Additional markings, in different colors, if desired, can be applied to predetermined spots on the belt in the same manner through additional recesses such as 29. When the markings are finished, the tensioning pulley 31 is raised by the use of pedal 40 whereupon the belt blank 32 can be removed from the pulley 10.

As noted above, scanning arm 24 may be used to control switches for automatic operation. As indicated, such operation would, through the use of limit switches and other means, control reversible motors which would drive carriage 3 and pulley 10 so as to automatically perform the marking operation. Switches similar to switch 21 in cooperation with a motor means would select the correct marking element 7. A locking device can be used so that pulley 10 and carriage 3 cannot be simultaneously operated.

The present invention may also be used with uncured belts. The uncured belt may be chucked while mounted on a rotatable mold such as seen in U.S. Pat. No. 3,078,206 issued on Feb. 19, 1963, to W. A. Skura. Any appropriate marking means which would still be visible after the curing of the belt could be used.

While the invention has been shown and described in certain preferred embodiments, it is to be understood that various changes and modifications may be made by one skilled in the art without departing from the principle of the invention, the scope of which is to be determined by the appended claims.

Having thus described my invention, what I claim and desire to protect by Letters Patent is:

1. An apparatus for the marking of toothed belts at predetermined distances along the belts and in fixed relationship to the belt teeth comprising:
    a belt chucking means having teeth corresponding to the belt teeth,
    a means for driving said chucking means,
    a length measuring wheel driven synchronously with the chucking means and having means for indicating the spacing of the markings to be applied,
    means for scanning said indicating means, and
    a marking means movable transversely across the backside of the belt to be marked at the points indicated by the scanning means.

2. The apparatus of claim 1 wherein the scanning device, in response to the indicating means, actuates an indicating display.

3. The apparatus of claim 1 wherein the scanning device in response to the indicating means, automatically stops the belt driving means.

4. The apparatus of claim 1 wherein the marking device is disposed on a carriage movable transversely across the belt and has several marking devices situated thereon for the application of different markings at different points along the belt.

5. The apparatus of claim 4 wherein the selection of the marking devices is automatically controlled by a means operably connected with the belt chucking means.

6. The apparatus of claim 4 wherein the marking carriage is driven by a reversible driving means controlled by limits switches actuated by the scanning means.

7. The apparatus of claim 1 wherein the length measuring wheel is easily replaceable so that measuring wheels with alternately positioned indicating means may be used to mark different positions.

8. The apparatus of claim 1 wherein the indicating means on the length measuring wheel cooperates with a means for controlling the movement of the chucking means and the marking means.

9. An apparatus for the automatic marking of tooth belts at predetermined distances along the belt and in fixed relationship to the belt teeth comprising:
    a belt chucking and driving means,
    a length measuring wheel driven synchronously with the chucking means and having means for indicating the spacing of the markings to be applied,
    means for scanning the indicating means,
    a marking means transversely movable across the belt to be marked,
    a driving means for said marking means, and
    a switching means controlled by said scanning means which alternately allows the belt driving means and the marking driving means to operate whereby the belt is advanced to predetermined points and thereafter appropriately marked automatically.

10. The apparatus of claim 9 wherein a second switching means operably connected to the chucking and driving means controls the selection of the type of marking to be made at each predetermined point.

* * * * *